(12) United States Patent
Cheng et al.

(10) Patent No.: US 7,765,497 B2
(45) Date of Patent: Jul. 27, 2010

(54) CIRCUIT NETWORK ANALYSIS USING ALGEBRAIC MULTIGRID APPROACH

(75) Inventors: Chung-Kuan Cheng, San Diego, CA (US); Zhengyong Zhu, Sunnyvale, CA (US)

(73) Assignee: The Regents of the University of California, Oakland, CA (US)

( * ) Notice: Subject to any disclaimer, the term of this patent is extended or adjusted under 35 U.S.C. 154(b) by 829 days.

(21) Appl. No.: 10/558,842

(22) PCT Filed: Jun. 1, 2004

(86) PCT No.: PCT/US2004/017237

§ 371 (c)(1),
(2), (4) Date: Jan. 18, 2007

(87) PCT Pub. No.: WO2004/109452

PCT Pub. Date: Dec. 16, 2004

(65) Prior Publication Data

US 2007/0157133 A1    Jul. 5, 2007

Related U.S. Application Data

(60) Provisional application No. 60/475,069, filed on May 30, 2003.

(51) Int. Cl.
*G06F 17/50* (2006.01)
(52) U.S. Cl. .................................... 716/2; 716/1; 716/4
(58) Field of Classification Search .............. 716/2, 716/4–6
See application file for complete search history.

(56) References Cited

U.S. PATENT DOCUMENTS

| 5,313,398 | A  | 5/1994  | Rohrer et al.       |
|-----------|----|---------|---------------------|
| 5,379,231 | A  | 1/1995  | Pillage et al.      |
| 5,467,291 | A  | 11/1995 | Fan et al.          |
| 5,694,052 | A  | 12/1997 | Sawai et al.        |
| 5,790,415 | A  | 8/1998  | Pullela et al.      |
| 5,888,875 | A  | 3/1999  | Lasky               |
| 6,141,676 | A  | 10/2000 | Ramirez-Angulo et al. |
| 6,308,300 | B1 | 10/2001 | Bushnell et al.     |
| 6,557,148 | B1 | 4/2003  | Nishida et al.      |
| 6,577,992 | B1 | 6/2003  | Tcherniaev et al.   |
| 6,662,149 | B1 | 12/2003 | Devgan et al.       |
| 6,665,849 | B2 | 12/2003 | Meuris et al.       |

(Continued)

FOREIGN PATENT DOCUMENTS

WO    2004/109452    12/2004

(Continued)

OTHER PUBLICATIONS

Black, J.R., "Electromigration Failure Modes in Aluminum Metalization for Semiconductor Devices," Proc. IEEE, pp. 1587-1594, Sep. 1969.

(Continued)

*Primary Examiner*—Paul Dinh
*Assistant Examiner*—Nha T Nguyen
(74) *Attorney, Agent, or Firm*—Fish & Richardson P.C.

(57) ABSTRACT

This application describes techniques for applying an algebraic multigrid method to analysis of circuit networks with irregular and regular circuit patterns. Adaptive processing may be applied to the grid coarsening and error smoothing operations to increase the processing speed.

27 Claims, 5 Drawing Sheets

U.S. PATENT DOCUMENTS

| | | | |
|---|---|---|---|
| 6,842,714 B1 * | 1/2005 | Acar et al. | 702/136 |
| 7,555,416 B2 | 6/2009 | Cheng et al. | |
| 2002/0131135 A1 | 9/2002 | Chow et al. | |
| 2003/0065965 A1 | 4/2003 | Korobkov | |
| 2003/0075765 A1 | 4/2003 | Ohnakado et al. | |
| 2003/0200071 A1 | 10/2003 | Zhang et al. | |
| 2003/0204828 A1 | 10/2003 | Iwanishi | |
| 2004/0008096 A1 | 1/2004 | Liu et al. | |
| 2004/0044510 A1 | 3/2004 | Zolotov et al. | |
| 2005/0076318 A1 | 4/2005 | Croix et al. | |
| 2005/0096888 A1 | 5/2005 | Ismail | |
| 2005/0102124 A1 | 5/2005 | Root et al. | |
| 2009/0132975 A1 | 5/2009 | Cheng et al. | |

FOREIGN PATENT DOCUMENTS

| | | |
|---|---|---|
| WO | WO 2006/078302 | 7/2006 |
| WO | WO 2006/132639 | 12/2006 |
| WO | WO 2007/005005 | 1/2007 |

OTHER PUBLICATIONS

Bobba et al., "IC power distribution challenges," IEEE/ACM International Conference on Computer Aided Design, pp. 643-650, (2001).

Brandt, A., "Multi-level adaptive solutions to boundary value problems," Math. Comput., 31: 333-390 (1977).

Briggs, W.L., "A Multigrid Tutorial," SIAM 2000, http://www.llnl.gov/casc/people/henson/mgtut/ps/mgtut.pdf (accessed on Apr. 6, 2006), 119 pages.

Cao et al, "HiPRIME: Hierarchical and Passivity Reserved Interconnect Macromodeling Engine for RLKC Power Delivery," IEEE/ACM Design Automation Conference, pp. 379-384, (2002).

Chen, H.a nd J. Neely, "Interconnect and circuit modeling techniques for full-chip power supply noise analysis," IEEE Transactions on Components, Packaging, and Manufactured Technology, Part B, vol. 21, No. 3, pp. 209-215, Aug. 1998.

Chen, T. And C. Chen, "Efficient Large-Scale Power Grid Analysis Based on Preconditioned Krylov-Subspace Iterative Methods," IEEE/ACM Design Automation Conference, pp. 559-562, (2001).

Devgan et al., "How to Efficiently Capture On-Chip Inductance Effects: Introducing a New Circuit Element K.," IEEE/ACM International Conference on Computer Aided Design, pp. 150-155 (Nov. 2000).

Katopis, G.A., "Delta-I Noise Specification for a High-performance Computing Machine," Proc. Of the IEEE, vol. 73, pp. 1450-1415, 1985 [Meditech, "Correction to: Katopis, G.A., 'Delta-I Noise Specification for a High-performance Computing Machine,' Proc. Of the IEEE, vol. 73, pp. 1450-1415, 1985," Proceedings of the IEEE 70(12): 1864 (Dec. 1985) attached following Katopis article].

Kozhaya et al., "Multigrid-like technique for power grid analysis," IEEE/ACM International Conference on Computer Aided Design, 2001. ICCAD 2001, Nov. 4-8, 2001, San Jose, California, pp. 480-487.

Kozhaya et al., "A multigrid-like technique for power grid analysis," IEEE Transactions on Computer-Aided Design of Integrated Circuits, vol. 21, Issue 10, pp. 1148-1160, Oct. 2002.

La Scala et al., "A relaxation type multigrid parallel algorithm for power system transient stability analysis," IEEE International Symposium on Circuits and Systems, 1989. May 8-11, 1989, Portland, Oregon, vol. 3, pp. 1954-1957 (1989).

La Scala, M. and A. Bose, "Relaxation/Newton methods for concurrent time step solution of differential-algebraic equations in power system dynamic simulations," IEEE Transactions on Circuits and Systems 1: Fundamental Theory and Applications, vol. 40, Issue 5, pp. 317-330 (May 1993).

Lee, Y. And C. Chen, "Power Grid Transient Simulation in Linear Time Based on Transmission-Line-Modeling Alternating-Direction-Implicit Methofs," IEEE/ACM International Conference on Computer Aided Design, pp. 75-80, (2001).

Lin, S. And N. Chiang, "Challenges in Power-Ground Integrity," IEEE/ACM International Conference on Computer Aided Design, pp. 651-654, (2001).

Nassif, S.R., "Fast Power Grid Simulation," IEEE/ACM Design Automation Conference, pp. 156-161, (2000).

Nassif, S.R. And J. Kozhaya, "Multigrid methods for power grid simulation," The 2000 IEEE International Symposium on Circuits and Systems, 2000. May 28-31, 2000, Geneva, Switzerland, vol. 5, pp. 457-460 (2000).

Stuben, K., "A review of algebraic multigrid," Journal of Computational and Applied Mathemactics,vol. 128 (No. 1-2): 281-309 (Mar. 1, 2001).

Stuben, K., "Algebraic Multigrid (AMG): An Introduction with Applications," GMD Report No. 70 (Nov. 1999), 127 pages.

Taylor, S., "The Challenge of Designing Global Signals in UDSM CMOS," IEEE Custom Integrated Circuits Conference, San Diego, CA, pp. 429-435, (1999).

Wang, K. and M. Marek-Sadowska, "Power/ground mesh area optimization using multigrid-based techniques [IC design]," Design, Automation and Test in Europe Conferences and Exhibition, 2003, Santa Barbara, CA, pp. 850-855 (Mar. 3-7, 2003).

Zhao et al., "Frequency domain analysis of switching noise on power supply network," IEEE/ACM International Conference on Computer Aided Design, pp. 487-492 (2000).

Zhao et al., "Hierarchical analysis of power distribution networks," IEEE Transactions on Computer-Aided Design of Integrated Circuits and Systems, vol. 21, No. 2, IEEE, pp. 159-168, Feb. 2002.

Zhu et al., "Power network analysis using an adaptive algebraic multigrad approach," Proceedings of the Design Automation Conference, 2003, San Diego, California, Jun. 2-6, 2003, pp. 105-108.

Acar et al., "TETA: Transistor Level Waveform Evaluation for Timing Analysis," IEEE Trans. On Computer-Aided Design, vol. 21, No. 5, (May 2002).

Afshari, E., et al., "Non-Linear Transmission Lines for Pulse Shaping in Silicon," Proc. of IEEE Custom Integrated Circuits Conference, pp. 91-94, Sep. 2003.

Backhouse et al., "WSix Thin Film for Resistors," Thin Solid Films, vol. 311, No. 1-2, pp. 299-303 (1997).

Beattie, M., et al., "IC Analyses Including Extracted Inductance Models" Proceedings of the $36^{th}$ ACM/IEEE conference on Design automation. Jun. 21-25, 1999, pp. 915-920 (6 pages). New Orleans, LA, USA.

Beckmann, B.M., et al., "TLC: Transmission Line Caches," Proceedings of the $36^{th}$ IEEE International Symposium on Microarchitecture (MICRO-36'03), 12 pages (2003).

Blaauw, D., et al., "Design and Analysis of Power Distribution Networks," Design of high-performance microprocessor circuits, Chapter 24, pp. 499-521, IEEE Press 2001 by the Institute of Electrical and Electronics Engineers, Inc., 3 Park Avenue, $17^{th}$ Floor, New York, NY, USA.

Chang et al, "RF/Wireless Interconnect for Inter- and Intra-Chip Communications," Proceedings of the IEEE, vol. 89, No. 4, pp. 456-466 (2001).

Chang et al., "Near Speed-of-Light Signaling Over On-Chip Electrical Interconnects," IEEE Journal of Solid-State Circuits, vol. 38, No. 5, pp. 834-838 (2003).

Chen, H., et al., "Surfliner: a distortionless electrical signaling scheme for speed of light on-chip communications," Proceedings of the 2005 International Conference on Computer Design (ICCD '05), 6 pages, (2005).

Dally et al, "High-Performance Electrical Signaling," IEEE Integrated Conference on Massively Parallel Processing Using Optical Interconnections, 6 pages, Jun. 1998.

Dally, W., "More about Wires Lossy Wires, Multi-Drop Buses, and Balanced Lines," EE273 Lecture 3 (10 pages). Sep. 30, 1998, Computer Systems Laboratory, Stanford University.

De Geus, A.J., "SPECS: simulation program for electronic circuits and systems." In Proceedings of the International Symposium on Circuits and Systems, pp. 534-537, May 7-10, 1984. Queen Elizabeth Hotel, Montreal, Canada.

Devgan, A., et al., "Adaptively Controlled Explicit Simulation." IEEE Transactions on Computer-Aided Design of ICs and Systems, vol. CAD-13(6), pp. 746-762, Jun. 1994.

Feldmann, P., et al., "Reduced-order modeling of large linear subcircuits via a block Lanczos algorithm," Proceedings of $32^{nd}$ DAC, pp. 474-479, 1995. San Francisco, California. ISBN:0-89791-725-1.

Gala, K., et al., "On Chip Inductance Modeling and Analysis," pp. 63-68. Inductance Models, DAC, Jun. 2000. Los Angeles, California.

He, L., et al., "An Efficient Inductance Modeling for Onchip Interconnects," CICC, May 1999, pp. 457-460. Town and Country Hotel, San Diego, California.

Ho et al., "The Future of Wires," Proc. of IEEE, vol. 89, No. 4, pp. 490-504 (Apr. 2001).

Ho, R., et al., "Efficient On-Chip Global Interconnectors," 2003 Symposium on VLSI Circuits Digest of Technical Papers, pp. 271-274, Jun. 2003.

International Search Report and Written Opinion dated Jun. 2, 2006, for PCT/US05/20369, international filing date Jun. 8, 2005 (9 pages).

Jokerst et al, "The Heterogeneous Integration of Optical Interconnections Into Integrated Microsystems," IEEE Journal of Selected Topics in Quantum Electronics, vol. 9, No. 2, pp. 350-360 (Mar./Apr. 2003).

Kerns, K.J., et al, "Stable and efficient reduction of substrate model networks using congruence transforms," Proceedings of ICCAD, pp. 207-214, 1995. San Jose, California.

Krauter, B., et al., "Generating Sparse Partial Inductance Matrices with Guaranteed Stability," Proceedings of the 1995 IEEE/ACM international conference on Computer-aided design. San Jose, California, pp. 45-52 (1995).

Kuhn et al., "Integration of Mixed-Signal Elements into a High-Performance Digital CMOS Process," Intel Technology Journal, vol. 6, Issue 2, pp. 31-42 (May 16, 2002).

Lee, Y.M., et al., "The power grid transient simulation in linear time on 3D alternating-direction-implicit method," Proceedings of the Design, Automation and Test in Europe Conference and Exhibition. pp. 1020-1025, (2003).

Lelarasmee, E., et al., "The Waveform relaxation method for the time-domain analysis of large scale integrated circuits." IEEE Transactions on Computer-Aided Design of ICs and Systems, vol. CAD-1(3), pp. 131-145, Jul. 1982.

Li, Z., et al., "SILCA: Fast-Yet-Accurate Time-Domain Simulation of VLSI Circuits with Strong Parasitic Coupling Effects," pp. 793-799, ICCAD 2003. San Jose, California.

Lin, S., "Stepwise equivalent conductance of circuit simulation." IEEE Transactions on Computer-Aided Design of ICs and Systems, vol. CAD-12(5), pp. 672-683, May 1993.

Lin, S., et al., "Transient simulation of lossy interconnects based on the recursive convolution formulation," IEEE Transactions on CAS I: Fundamental Theory and Applications, vol. 39, pp. 879-892. Nov. 1992.

Maheshwari, A., et al., "Differential Current-Sensing for On Chip Interconnects," IEEE Transactions on Very Large Scale Integration (VLSI) Systems, vol. 12, No. 12, pp. 1321-1329 (Dec. 2004).

Namiki, T., et al., "New FDTD algorithm free from the CFL condition restraint for a 2D-TE wave," IEEE Antennas Progagat. Symp. Dig., pp. 192-195, (Jul. 1999).

Newton, A.R., et al., "Relaxation based electrical simulation." IEEE Transaction on Computer-Aided Designs of ICs and Systems, vol. CAD-3(4), pp. 30-330. Oct. 1984.

Odabasioglu, A., et al., "PRIMA: Passive Reduced-Order Interconnect Macromodeling Algorithm," Proc. ACM/IEEE ICCAD Nov. 1997, pp. 58-65. San Jose, California.

Phillips, J.R., et al., "Guaranteed passive balancing transformations for model order reduction," Proceedings of $39^{th}$ DAC, pp. 52-57, 2002.

Raghavan, V., et al., "AWESpice: A general tool for the accurate and efficient simulation of interconnect problems," Proceedings of the $29^{th}$ ACM/IEEE conference on Design Automation, pp. 87-92, Jun. 8-12, 1992. Anaheim, California.

Sakallah, K.A., et al., "SAMSON2: an event driven VLSI circuit simulator." IEEE Transactions on Computer-Aided Design of ICs and Systems, vol. 4(4), pp. 668-684. Oct. 1985.

Stojanovic, V. et al., "Adaptive Equalization and Data Recovery in a Dual Mode (PAM2/4) Serial Link Transceiver," 2004 Symposium on VLSI Circuits Digest of Technical Papers, pp. 348-351 (2004).

Visweswariah, C., et al., "Piecewise Approximate Circuit Simulation." IEEE Transactions on Computer-Aided Design of ICs and Systems, vol. CAD-10(7), pp. 861-870, Jul. 1991.

Wachspress, et al., "An alternating-direction implicit iteration technique," J. Soc. Ind. and Appl. Match 8: 403-424 (1960).

White, J., et al., "RELAX2: a new waveform relaxation approach for the analysis of LSI MOS circuits." In Proceedings of the International Symposium on Circuits and Systems (ISCAS), pp. 756-759, vol. 2. May 1983. Newport Beach, California.

Zheng et al., "Toward the development of a three-dimensional unconditionally stable finite-difference time domain method," IEEE Tran. Microwave Theory and Techniques, vol. 48, No. 9, (9 pages). Sep. 2000.

Zhu, et al., "Efficient Transient Simulation for Transistor-Level Analysis," EDA Technofair Design Automation Conference Asia and South Pacific Proceedings of the 2005 Conference on Asia South Pacific Design Automation, Shanghai, China (2005) pp. 240-243, published by the ACM, New York, NY, USA.

Chen, T., et al., "Efficient Large-Scale Power Grid Analysis Based on Preconditioned Krylov-Subspace Iterative Methods", Proc. $38^{th}$ Design Automation Conf. (IEEE Cat. No. 01CH37232), ACM, New York, NY, USA, pp. 559-562, Jun. 2001.

Lahaye, D., et al., "Algebraic Multigrid for Complex Symmetric Systems", IEEE Transactions on Magnetics, 36(4):1535-1538, Jul. 2000.

Non-Final Office Action dated Sep. 9, 2008 for U.S. Appl. No. 11/777,211, filed Jul. 12, 2007 (20 pages).

International Search Report and Written Opinion date Dec. 30, 2005 for PCT/US05/20242, international filing date Jun. 7, 2005, (12 pages).

International Search Report and Written Opinion dated Sep. 26, 2006 for PCT/US05/23131, international filing date Jun. 29, 2005 (11 pages).

International Search Report and Written Opinion dated Dec. 17, 2004 for PCT/US04/17237, international filing date Jun. 1, 2004 (12 pages).

Supplementary European Search Report dated Jul. 12, 2006 for EP 04 753 957, (2 pages).

European Examination Report dated Nov. 2, 2006 for EP 04 753 957, (6 pages).

Zhu, Z. et al., "An unconditional stable general operator splitting method for transistor level transient analysis," Asia and South Pacific Conference on Design Automation, Jan. 24-27, 2006, 6 pages.

* cited by examiner

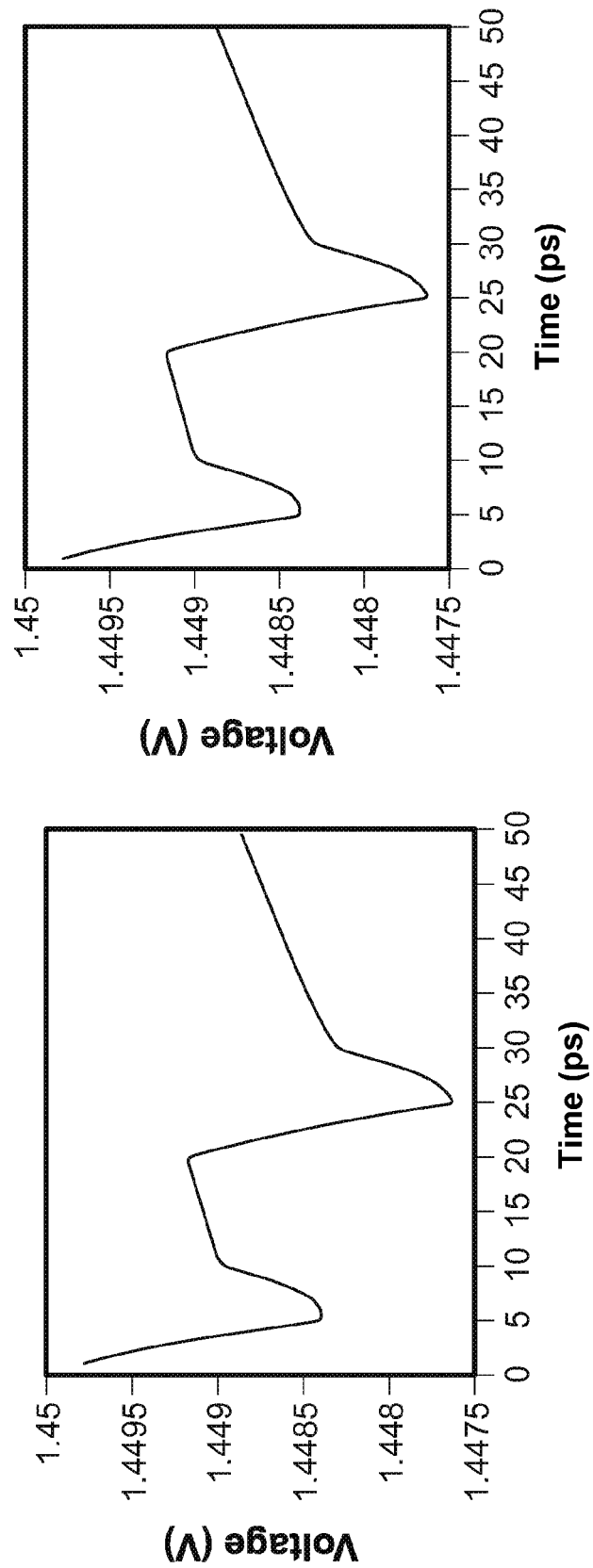

CIRCUIT NETWORK ANALYSIS USING ALGEBRAIC MULTIGRID APPROACH

This application claims the benefit of International Patent Application No. PCT/US2004/017237, filed Jun. 1, 2004, which further claims the benefit of U.S. Provisional Patent Application No. 60/475,069 entitled "CIRCUIT NETWORK ANALYSIS USING ADAPTIVE ALGEBRAIC MULTI-GRID APPROACH" and filed on May 30, 2003, the entirety of which are incorporated herein by reference as part of this application.

BACKGROUND

This application relates to analysis of circuit networks such as power networks and clock networks and circuit simulation techniques.

Circuits may be viewed as networks of nodes and circuit components connected between nodes. As such, circuits may be analyzed based on a nodal analysis where a nodal equation may be written for each node based on the conversation of charge at the node, i.e., the total current entering the node is equal to the total current leaving the node (the Kirchoff's second rule). For a circuit with N nodes, N equations for the N nodes can be expressed in terms of the properties of circuit components such as resistance, capacitance, and inductance, and in terms of the node voltages and currents. These N equations can be written into a matrix equation and are solved using various matrix approaches. For circuits with certain control sources, inductance and current control sources, additional equations for different current branches may be added to fully describe the circuits.

Power network analysis may be performed based on the circuit matrix equations to investigate behaviors of circuit networks such as voltage drop, voltage oscillation, and electromigration. Excessive voltage drops may reduce the switching speed as well as the noise margins of circuits and may even cause logic failures under some circumstances. Electromigration may decrease the chip lifetime. Moreover voltage oscillation may occur when power network resonance frequency drops to the range of the signal frequency.

One bottleneck of the power network analysis based on the above nodal analysis is the tremendous amount of variables in large power network such as an integrated circuit. One well-known circuit network analysis software program for solving such nodal equations is the SPICE circuit simulator originally developed by the University of California at Berkeley. The SPICE uses the LU decomposition to solve the nodal equations for the node voltages. As the number of the circuit elements and nodes increases, the convergence of the LU deposition method and other direct methods slows down and becomes inadequate for various circuits with a large number of circuit elements and nodes.

Therefore, there is a need for power network analysis and circuit simulation techniques capable of analyzing circuits with large numbers of nodes and elements and produce fast convergence.

SUMMARY

The techniques described in this application apply an algebraic multigrid method to analysis of circuit networks. In one implementation, for example, a method for analyzing a circuit network include representing a circuit network by using a plurality of levels of grids with different numbers of nodes to represent the circuit network according to an algebraic multigrid method, applying a restriction mapping from one level to a next coarser level to propagate computation results of the one level to the next coarse level, and applying an interpolation mapping from one level to a next finer level to propagate computation results of the one level to the next finer level. In each level, an iterative smoothing operation is performed to obtain computation results of each level comprising states of nodes in each level. The above restriction mapping and the iterative smoothing operation from the finest level to the coarsest level and the interpolation mapping and the iterative smoothing operation from coarsest level back to the finest level are repeated for at least one time to obtain a solution to the circuit network.

As another example, a method for analyzing a circuit network includes the following steps. An algebraic multigrid method is applied to a matrix representative of a circuit network to construct a plurality of matrices with different degrees of coarsening grids. The regions in the circuit network with active circuit activities are represented by active grids and regions in the circuit network with less active circuit activities are represented by inactive grids.

In yet another example, a method for analyzing a circuit network includes representing a circuit network by using a matrix of nodes having fine nodes and coarse nodes and applying an adaptive coarse grid construction procedure to assign grid nodes in the matrix as either coarse grid nodes or fine grid nodes. This assignment is made according to (1) circuit activities and (2) a matrix structure of the matrix. Next, iterative smoothing operations are applied at selected local fine grids corresponding to active regions at a finest level obtained in the adaptive coarse grid construction procedure.

Different from some other on-chip power grid analysis methods that focus on IR-drop caused by the resistance of the power network, the exemplary analysis methods described here may include the contribution of the inductance of the circuit networks because such an effect becomes comparable with the contribution of the resistance when the signal frequency increasing to a certain level. In addition, adaptive features in the grid coarsening and the error smoothing operations described here can significantly improve the processing speed.

These and other implementations, examples, and associated advantages are described in detail in the drawings, the detailed description, and the claims.

BRIEF DESCRIPTION OF DRAWINGS

FIGS. 5A and 5B compare the transient analysis voltage waveforms of one node from SPICE and the present adaptive AMG approach.

DETAILED DESCRIPTION

Figure 1:
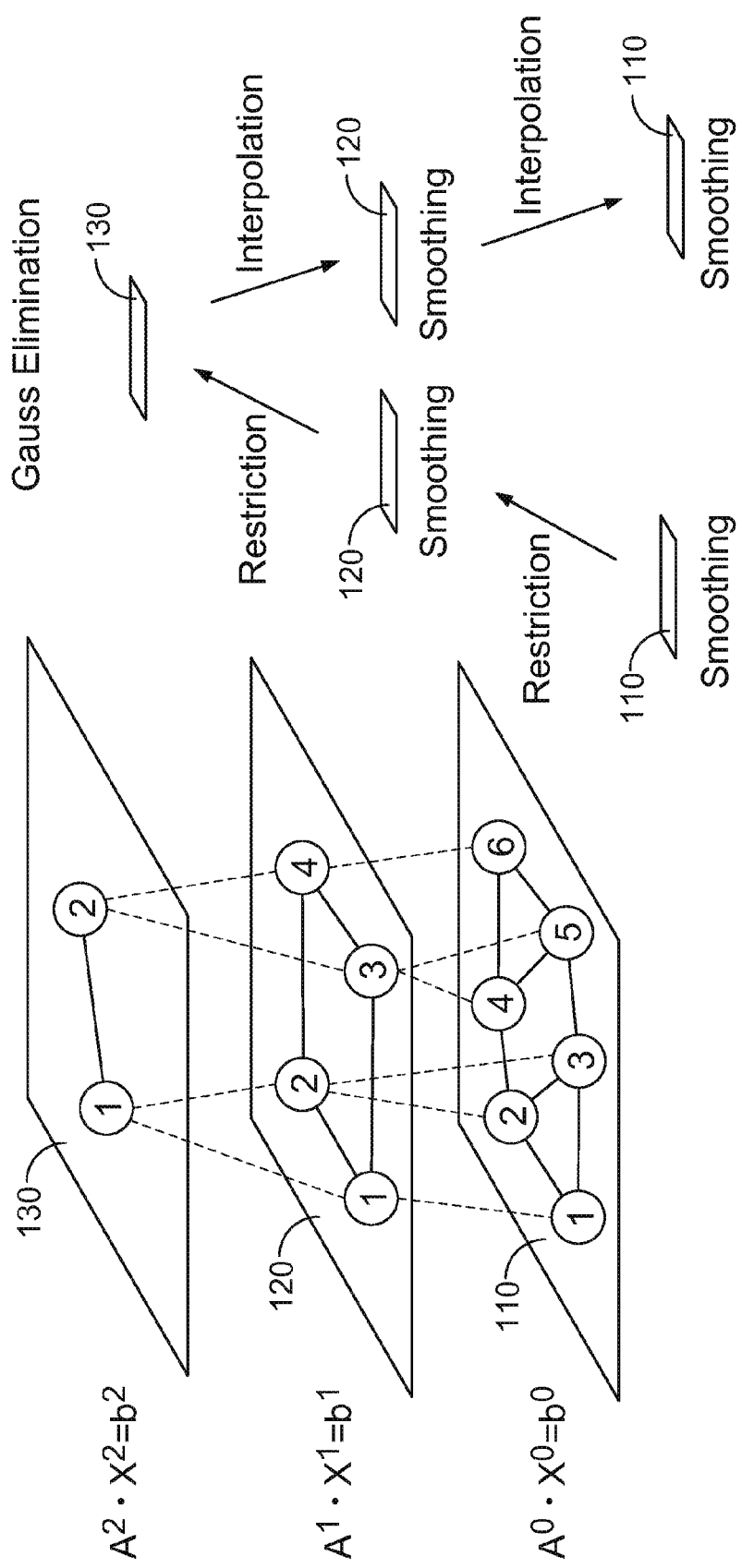
FIG. 1 illustrates an example of a three-level multigrid structure for a circuit network and the corresponding processing operations for mapping between different levels and error smoothing at each level according to one implementation.

The network analysis methods described here are based on algebraic multigrid (AMG) methods described by W. L.

Briggs in "A Multigrid Tutorial", SIAM 2000. The AMG is a multigrid method and is an efficient technique for solving partial differential equations. The basic idea of a multigrid method is to map the hard-to-damp low frequency error at fine level to easy-to-damp high frequency error at coarse level, solve the mapped problem at coarse level, and then map the error correction of coarse level back to fine level. A hierarchical grid structure with multiple levels is constructed to perform such multigrid computations. At each level, a forward iterative smoothing operator such as Gauss-Seidel erases high frequency errors. There are two kinds of multigrid methods: the geometric multigrid and the algebraic multigrid (AMG). The geometric multigrid method generally requires regular mesh structures. AMG does not require a regular mesh structure and can apply to other non-regular structures. In at least this regard, the AMG is a good alternative to the geometric multigrid method. The coarsening and interpolation operations of the AMG are based on the matrix itself. This overhead may make the AMG less efficient than the geometric multigrid method if the problem analyzed has a regular mesh structure.

Many circuits, such as digital or mixed-signal circuits, usually have irregular structures. The network analysis methods described here adopt the algebraic multigrid method and do not require a regular circuit pattern. Hence, circuits with irregular circuit patterns can be analyzed.

In another aspect, various other power grid analysis techniques focus on voltage drops caused by resistance of the power network without analyzing the effects of the inductance present in the network. As the signal frequency increases, the effects of the inductance of the on-chip power network become comparable with those of the resistance. Therefore, the effects of the inductance may no longer be ignored in order to properly characterize the circuits. The network analysis methods described here based on the AMG may be designed to include the effects of the inductance such as the self and mutual inductances in the circuits. Accuracy of the present network analysis methods is checked and assured by comparing the norm of residue with the user-defined error tolerance.

In addition, the network analysis methods described here perform the error smoothing operations in each of the multiple iterations through the multigrid cycles. The iteration terminates only after the norm of the residue error is smaller than a pre-determined error tolerance level or threshold value.

Furthermore, the network analysis methods described here integrate adaptive grid structures and adaptive smoothing operations to capture the multi-rate behavior and circuit latency in various networks. This adaptive design allows active circuit regions to be assigned with more computation in order to accurately capture the behavior of these regions and allows for inactive circuit regions to be assigned with less computation in reduce the computation load. The circuit spatial and temporal latency are fully explored along with the multi-rate behavior to avoid any unnecessary computation without losing accuracy and convergence of the analysis. The present methods also have the ability to analyze coupling effects with electromagnetic retardations for high-frequency chip-package-board scale analysis. Hence, as one example, the effects of inductance in the circuits can be included in the analysis.

A general circuit network with N nodes may be mathematically represented a matrix equation after the integral approximation:

$$A^0 x = b,$$

where x is a vector of node voltages, b is a matrix that represents effects of current sources in the circuit network and contributions from solutions of previous time points, and the matrix $A^0$ represents the spatial structure of the circuit network. For a circuit with a large number of nodes, the matrix $A^0$ is large and it may be computationally complex to solve the matrix equation for the node voltages in x.

Based on the AMG concept, the circuit network represented by the matrix A may be "coarsened" into one or more simplified hierarchical grids representing circuit networks of different levels of coarsening with reduced number of nodes, such as $A^1$, $A^2$, etc. The first level coarsened circuit network, A1, for example, may use one node to represent two or more nodes within a circuit region in the original circuit network A0. The second level coarsened circuit network, A2, may use one node to represent two or more nodes in a circuit region in the first level coarsened circuit network A1. Instead of directly solving the large matrix equation $A^0 x = b$, multiple levels of circuit networks A0, A1, and A2 are solved in an iterative manner to propagate residual errors to be removed by iterative smoothing from one grid to the next coarser grid and to use the solutions of one as the initial solutions for the next finer grid. For example, certain low spatial frequency errors may be smoothed at the coarse levels A0 and A1 while some high spatial frequency errors may be smoothed at the coarsest level A2. In this example, the original matrix equation is essentially converts into three matrix equations with different levels of coarsening in their circuit spatial structures:

$$A0x0 = b0$$

$$A1x1 = b1$$

$$A2x2 = b2.$$

The residual errors are propagated from A0 to A1 and finally to A2 through restriction mapping while the solutions are propagated from A2 to A1 and finally to A0 through interpolation mapping. For one single iteration cycle, the computation may follow the following mapping routine:

$$A0 \rightarrow A1 \rightarrow A2 \rightarrow A1 \rightarrow A0.$$

Certainly, more than 3 levels of coarsening may be implemented. It is noted that the computation for solving A0x0=b0 here is different from directly solving the original matrix equation A0x=b due to the mapping.

FIG. 1 illustrates one example of the above multigrid mapping. The plane 110 represents the original circuit network A0 before any coarsening where 5 nodes are shown. The plane 120 represents a first coarsened circuit network (A1) where node 1 in A1 is mapped from node 1 on A0, node 2 on A1 is mapped from nodes 2 and 3 on A0, etc. The plane 130 represents a second coarsened circuit network (A2) based on A1, where the node 1 on A2 is mapped from nodes 1 and 2 on A1 and node 2 on A2 is mapped from nodes 3 and 4 on A1. The mapping from one level grid (e.g., A1) to a coarser level grid (e.g., A2) is a restriction. The mapping from one level grid (e.g., A1) to a finer level grid (e.g., A0) is an interpolation. At each level, an iterative solver is used to solve the matrix equation at that level and to smooth the errors. The residual error from each level is the absolute value of the difference between A0x0 and b0 for A0, A1x1 and b1 for A1, or A2x2 and b2 for A2. The residual error is mapped along with the nodes to the next coarser level so that the errors are continuously smoothed.

FIG. 1 further shows the computation process in the flowchart on the right hand side. Smoothing is performed at each level in the restriction process from the finest level to the coarsest level and in the interpolation process from the coarsest level to the finest level. Hence, errors with high spatial frequencies that are not reduced at the fine levels will be smoothed at the coarse level. In particular, the cycle is repeated until the residual error falls below a pre-determined threshold value.

The computations in a single multigrid cycle shown in FIG. 1 may be mathematically described as follows in a single V-cycle scheme. The mapping operator from a fine level to a coarse level is called restriction operator $I_h^{2h}$. A coarse to fine level mapping operator is called interpolation operator $I_{2h}^{h}$. The system matrix equation $A^h u^h = f^h$ is solved hierarchically at different levels; the superscript refers to the level of the grid structure.

Single V-Cycle Scheme: $V^h \leftarrow V^h(v^h, f^h)$
Relax on $A^h u^h = f^h$ for $v_1$ times with an initial guess $v^h$ as the solution
compute the residue: $r^h = f^h - A^h u^h$
Compute $f^{2h} = I_h^{2h} r^h$ (restriction mapping)
  Relax on $A^{2h} u^{2h} = f^{2h}$ for $v_1$ times with an initial guess $v^{2h} = 0$, $r^{2h} = f^{2h} - A^{2h} u^{2h}$
  Compute $f^{4h} = I_{2h}^{4h} r^{2h}$ (restriction mapping)
    Relax on $A^{4h} u^{4h} = f^{4h}$ for $v_1$ times with an initial guess $V^{4h} = 0$,
    Compute residue $r^{4h} = f^{4h} - A^{4h} u^{4h}$
    Compute $f^{8h} = I_{4h}^{8h} r^{4h}$
    to coarsest level
    Correct $u^{4h} \leftarrow u^{4h} + I_{8h}^{4h} u^{8h}$ (Interpolation mapping)
    Relax on $A^{4h} u^{4h} = f^{4h}$ for $v_2$ times with an initial guess $u^{4h}$
  Correct $u^{2h} \leftarrow u^{2h} + I_{4h}^{2h} u^{4h}$ (interpolation mapping)
  Relax on $A^{2h} u^{2h} = f^{2h}$ for $v_2$ times with initial guess
Correct $u^h \leftarrow u^h + I_{2h}^{h} u^{2h}$ (interpolation mapping)
Relax on $A^h u^h = f^h$ for $v_2$ times with initial guess $u^h$ In the above example, the matrix, $I^l$ (l=h, 2h, 4h, 8h, etc.), represents the mapping operation from one level to an adjacent level, and $r^l$ represents the residual error at the level l (=h, 2h, 4h, 8h, etc.). The mapping operator $I^l$ from fine to coarse level is called restriction operator, and a mapping operator from coarse to fine level is called an interpolation operator. The parameters $v_1$ and $v_2$ are constant numbers for the number of iterations at different levels.

The basic idea of the above multigrid approach is to map the hard-to-damp low frequency errors at a fine level to easy-to-damp high frequency errors at a coarse level, solve the mapped problem at coarse level, and then map the error correction of the coarse level back to the fine level. At the fine level, the high-frequency errors that are not erased by the smoothing at the coarse level are smoothed out. Therefore, errors with different spatial frequencies are smoothed out through the operations at different levels. At each level, the high frequency error for that level is erased by a smoothing operator that is a forward iterative method such as the Gauss-Seidel method.

The number of the levels of grids is selected based on the specific layouts and properties of circuit networks. In one implementation, for example, the construction of hierarchical grid structure stops at the level when the reduced matrix can be quickly solved by a direct solving method such as a Gaussian elimination method. For example, the LU decomposition or factorization method, which is an extension of the Gaussian elimination, may be used to find the coarsest level. Once the exact solution of the problem at the coarsest level is found, the interpolation is performed from the coarsest level back to the finest grid, i.e., the original circuit grid, by interpolation from one level to a next finer level and smoothing operation at each level. An iteration of restriction from the fine grid to the coarsest grid and interpolation from the coarsest grid back to the fine grid is called a single multigrid cycle, which will iterate several times till the solution converges when the residual error is reduced below a threshold.

The network analysis methods described here may use different models for different circuit components. For circuits with passive circuit elements exhibiting resistance (R) and capacitance (C) without conductance (L), the system equation for the circuits may be formulated as $$C\dot{X}(t) + GX(t) = U(t), \quad (2.1)$$

where X is the vector of the nodal voltages and G is the conductance (1/R), U(t) represents the current from a current source. Applying trapezoidal approximation with a time step of h to equation (2.1) produces the following:

$$\left(G + \frac{2}{h}C\right)X(t+h) = -\left(G - \frac{2}{h}C\right)X(t) + U(t) + U(t+h) \quad (2.2)$$

The left hand side matrix in (2.2) is symmetric and positive definite which makes the iterative methods converge quickly.

When inductance is included, the system matrix equation may be written as follows:

$$\hat{C}\dot{\hat{X}}(t) + \hat{G}\hat{X}(t) = \hat{U}(t) \quad (2.3)$$

where $$\hat{C} = \begin{bmatrix} C & 0 \\ 0 & L \end{bmatrix}, \hat{X} = \begin{bmatrix} V \\ I \end{bmatrix}, \hat{U} = \begin{bmatrix} U \\ 0 \end{bmatrix} \text{ and } \hat{G} = \begin{bmatrix} G & -A_l^T \\ A_l & 0 \end{bmatrix}$$

Equation (2.3) can be rewritten as:

$$\begin{bmatrix} C & 0 \\ 0 & L \end{bmatrix} \begin{bmatrix} \dot{V} \\ \dot{I} \end{bmatrix} + \begin{bmatrix} G & -A_l^T \\ A_l & 0 \end{bmatrix} \begin{bmatrix} V \\ I \end{bmatrix} = \begin{bmatrix} U \\ 0 \end{bmatrix} \quad (2.4)$$

Applying trapezoidal approximation with time step h, the solution of equation (2.4) is derived by $$\begin{bmatrix} \frac{2C}{h} + G & -A_l^T \\ A_l & \frac{2L}{h} \end{bmatrix} \begin{bmatrix} V(t+h) \\ I(t+h) \end{bmatrix} = \quad (2.5)$$

$$\begin{bmatrix} \frac{2C}{h} - G & A_l^T \\ -A_l & \frac{2L}{h} \end{bmatrix} \begin{bmatrix} V(t) \\ I(t) \end{bmatrix} + \begin{bmatrix} U(t+h) + U(t) \\ 0 \end{bmatrix}$$

Although the modified nodal analysis (MNA) method can handle elements without the description of the admittance, the transient analysis system matrix in (2.5) is no longer symmetric and positive definite when the inductance is included because of the introduction of current variables. Since Multigrid and the PCG method require the matrix to be symmetric positive definite, some extra processing is needed to reformulate the system. Accordingly, the variable vector is split into a nodal voltage vector and a branch current vector. Using block matrix operations, the Equation (2.5) can be decomposed into two iteration formulas for nodal voltages and branch currents, respectively:

$$\Rightarrow \begin{cases} \left(\frac{2C}{h} + G - \frac{h}{2}A_l^T L^{-1} A_l\right)V(t+h) = \\ \left(\frac{2C}{h} - G + \\ \frac{h}{2}A_l^T L^{-1} A_l\right)V(t) + [U(t) + U(t+h)] + 2A_l^T I(T) \\ I(t+h) = I(t) - \frac{h}{2}L^{-1}A_l[V(t+h) + V(t)] \end{cases} \quad (2.6)$$

In Equation (2.6), $L^{-1}$ corresponds to the K matrix in A. Devgan, et al., "How to Efficiently Capture On-Chip Inductance Effects: Introducing a New Circuit Element K", IEEE/ACM International Conference on Computer Aided, pp 150-155(November 2000). The matrix inversion overhead is reduced by sparsification methods. If the inductance matrix is symmetric and positive definite (S.P.D.), the system matrix is still S.P.D. This condition also holds for forward Euler, backward Euler integration approximation methods. Note that the topology of reformulated system matrix in (2.6) is no longer the same as original circuit topology. Geometric based coarse grid reduction algorithm cannot be applied to RLC network directly.

Figure 2:
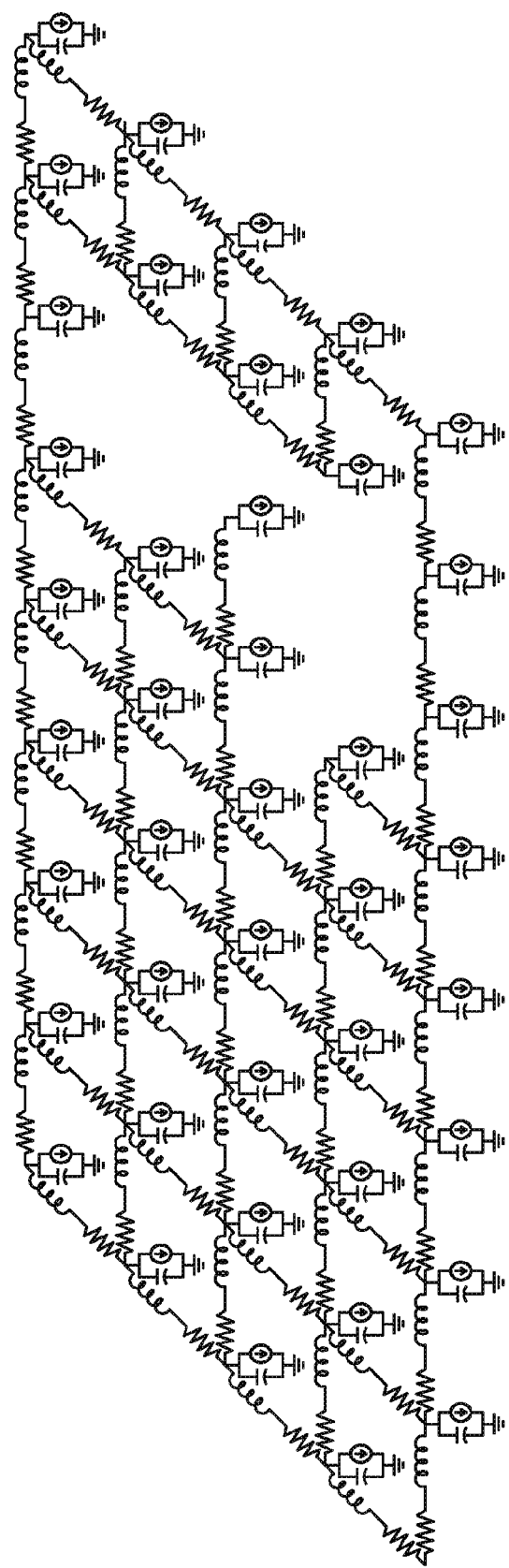
FIG. 2 illustrates an example of a linear RLC circuit network with an irregular spatial circuit pattern which is suitable for an algebraic multigrid analysis described in this application.

As an example for power source networks, a power source network may have separated power and ground. In many applications, a power network may have an irregular mesh as shown in FIG. 2. Every intersection node may have a ground capacitance. Between neighboring intersection nodes is a resistor, or a resistor and a inductor in series. Mutual inductance can also be included. The devices with activities can be modeled as time-varying current sources.

The AMG method has no grid concept. In adopting the AMG approach, the network analysis methods described here determine the exact expressions of the inter-level mapping operators, i.e., the restriction and interpolation, based on the original matrix A for the particular circuit network of interest. In AMG, a smooth error means error components with relatively small residuals. See, e.g., the cited tutorial by Briggs. Hence, after several iterations of the smoothing operation, the residue is small but the error decreases slowly:

$$Ae \approx 0 \quad (3.1)$$

where e denotes the algebraic error vector and is a difference between the vector u and its approximation vector v. Equation (3.1) can be rewritten as follows:

$$a_{ii}e_i \approx \sum_{j \neq i} a_{ij}e_j \quad (3.2)$$

Hence the error of a fine node can be well represented by linear combinations of its neighbors' errors.

If coarse and fine nodes have already been defined, the error of the fine node may be approximated by errors of only its coarse node neighbors for an interpolation process. Certainly, other interpolation methods may be used. This simple approach works well for the power grid problem. From Equation (3.2), the interpolation operator $I_{2h}^h$ can be constructed. The mapping between levels in two directions are symmetric and therefore the restriction operator $I_h^{2h}$ can be obtained by the transposition of the interpolation operator, i.e. $I_{2h}^{h^T} = I_h^{2h}$. Accordingly, the coarse level matrix can be computed as $A^{2h} = I_{2h}^h A^h I_h^{2h}$. As a result, the coarse level matrix $A^{2h}$ remains symmetric positive definite. If the matrix is symmetric and positive definite, the convergence of AMG can be guaranteed as long as the smoothing operation converges at each level. A detailed proof for this can be found in, e.g., K. Stuben, "Algebraic Multigrid: An Introduction with Applications", GMD Report No. 53 (March 1999).

In some power grid networks, the RLC values may be uniform at the same layer. Due to the non-uniform power densities and the timing of the switching events, the power supply noise may exhibit a spatial variation. Therefore, some nodes of the power network may have more rapid nodal voltage changes than other nodes. These nodes with rapid changes are more active than the rest nodes of the circuit network.

Because of such differences in node activities, the nodes in the circuit network are not computationally equal in the sense that the rapid changes in "active" nodes should be monitored and analyzed more accurately to adequately model their behavior than the relatively slow changes in "inactive" nodes in order. This different computational treatments can be used to accurately characterize the circuit network, to achieve fast convergence in the computation, and to reduce unnecessary computation. In recognition of above, the network analysis methods described here may be implemented in a way to be "adaptive" in applying the multigrid coarsening so that active regions have finer grid structures than inactive regions.

In implementing the adaptive coarsening scheme in the multigrid framework, active regions are assigned with relatively finer grids at a coarse level. The coarse grid nodes can be determined adaptively by the circuit activities as well as by the matrix representation of the circuit network (i.e., the spatial structure of the circuit). The coarse grid may include two kinds of nodes: non-adaptive and adaptive coarse nodes. Non-adaptive coarse nodes are selected by a coloring scheme according to the matrix. Adaptive coarse nodes can be determined by the circuit activities.

The selection of non-adaptive coarse nodes may use a two-level coloring scheme at every level of the hierarchical multigrid structure except the coarsest level. Initially, at a given level of the grid other than the coarsest grid, the potential of each node is set to its degree, i.e., the number of directly connected neighboring nodes. The node with the maximum potential (the maximal directly connected neighboring nodes) is selected to be a coarse node (the first coarse node) and all its unassigned neighboring nodes are set as fine nodes. Next, for each newly set fine node, the potential of every neighboring node of such a fine node is increased by 1. At this time, among the currently unassigned nodes, the node with the maximum potential is selected as the second coarse node and its directly connected neighboring nodes are set as fine nodes. This process is repeated until every node has been assigned as a fine or coarse node. At the end, each fine node has at least one neighboring coarse node. This assignment of fine and coarse nodes at each level is made regardless of the circuit activities. Fine and coarse nodes are graphically represented by two different colors and thus this method of assigning nodes is called two color scheme.

Adaptive coarse nodes can be selected according to the activities of circuits. One suitable candidate for the measurement of the impact of circuit activities is the first order derivative of nodal voltages. As an example, the first order derivatives of nodal voltages for a RLC network shown in FIG. 2 may be approximated from Equation (2.4). Since not every node has a ground capacitor, the voltage vector V may be split into two separate voltage vectors $V_1$ and $V_2$, where $V_1$ is the set of nodes each with a ground capacitor and $V_2$ is the set of nodes between resistance and inductance in branches. The first order derivative of the nodal voltage in V1 can be calculated as follows. From Equation (2.4), the following can be derived:

$$\begin{bmatrix} \dot{C} & & \\ & 0 & \\ & & L \end{bmatrix} \begin{bmatrix} \dot{V}_1 \\ \dot{V}_2 \\ \dot{I} \end{bmatrix} = - \begin{bmatrix} G_{11} & G_{13} & -A_{11}^T \\ G_{21} & G_{33} & -A_{12}^T \\ A_{13} & A_{12} & 0 \end{bmatrix} \begin{bmatrix} V_1 \\ V_2 \\ I \end{bmatrix} + \begin{bmatrix} U \\ 0 \\ 0 \end{bmatrix} \quad (4.1)$$

The first order derivative of intersection node voltage can be approximated as $$\dot{V}_1(t+h) = -C^{-1}[G_{11}V_1(t) + G_{12}V_2(t) - A_{11}^T I(t) + U(t+h)] \quad (4.2)$$

The inversion of the capacitance matrix can be readily achieved because the capacitance matrix is actually a diagonal matrix. In this particular implementation, the nodes with relatively large voltage derivatives are "active" and thus are selected as adaptive coarse nodes. A threshold value for the first-order derivate may be selected, so that nodes with first-order derivatives greater than the threshold can be selected as adaptive coarse nodes.

In some implementations, this adaptive coarsening based on circuit activities may be applied at the finest level of the hierarchical multigrid structure. The coarse grid selection at other levels may be determined solely by the coloring scheme in part because active components with finer first level coarse grid will still have relatively finer grid on the next coarse levels.

Figure 3B:
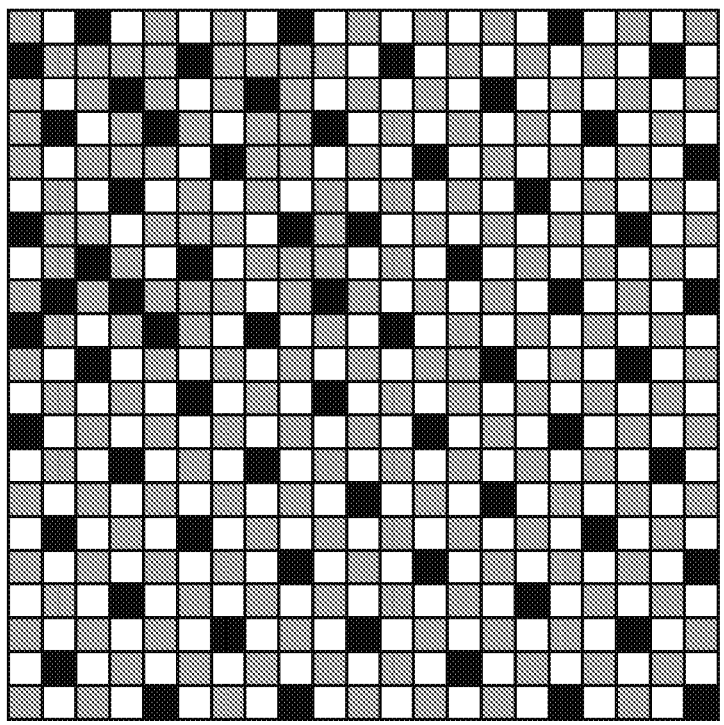
FIGS. 3A and 3B illustrate examples of coarsening structures based on coarsening techniques described in this application.
Figure 3A:
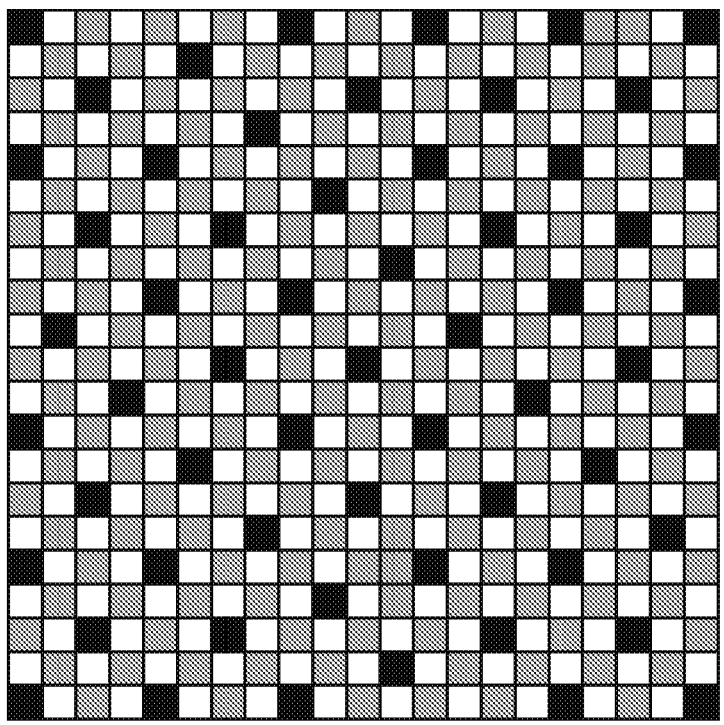

FIGS. 3A and 3B show examples of non-adaptive and adaptive coarsening structures, respectively, where FIG. 3A shows a non-adaptive coarsening structure and FIG. 3B shows an adaptive coarsening structure. The grey scale of the color increases with the degree of the coarsening so that a fine level is represented by a light color and a coarse level is presented by a dark color. The darker color indicates the coarser a level in the grid structure is. In FIG. 3A, three different colors represent three different grid levels. In FIG. 3B, the coarsening structure solely based on the two-level coloring scheme are modified at each coarsening level based on the circuit activities. In this particular example, the circuit activities apparently concentrate in the up-right corner of the circuit and therefore more adaptive coarse nodes are selected in this region. An active region has finer grid than the other region in every grid level.

FIG. 3A shows the nodes in the finest grid which includes all coarse nodes (adaptive and non-adaptive) and fine nodes. A coarse grid based on the finest grid in FIG. 3A may include only the coarse nodes. For example, the medium grey nodes may represent nodes in the grid A1 shown in FIG. 1 and the dark grey nodes may represent nodes in the grid A2, the coarsest grid, in FIG. 1. FIG. 3B shows the finest grid A0 with adaptive coarse nodes. Coarse nodes Many circuits display spatial and temporal latency as well as multi-rate behaviors. Spatial latency in this context means only part of a circuit network has activities at any time point while other parts of the circuit network are inactive. Temporal latency in this context refers to the situation where a given portion of the circuit network is active in some periods but inactive in other periods. The multi-rate behaviors refer to active portions of a circuit network have various change rates in their currents and voltages.

Hence, additional "adaptive" features may be implemented in the present network analysis methods to avoid or reduce certain unnecessary computations based on the spatial and temporal latency as well as multi-rate behaviors. As an example, different regions of a circuit network may be simulated with various time step sizes according to their activities. This may be carried out without imposing a minimum time step size to the entire circuits for the sake of convergence. Referring back to FIG. 1, simulations of these different regions are not separated from other regions of the circuit network due to the multigrid restrictions and interpolations throughout different levels. This is different from various partition-based commercial fast simulators which use variations in the time step sizes for each subcircuit and solve each subcircuit separately. Such commercial simulators may reduce the computation overhead but suffer poor convergence and the difficulties in capturing mutual inductance coupling effect correctly.

The network analysis methods described here may incorporate adaptive grid structures and adaptive smoothing operations to capture the multi-rate behavior and circuit latency. Active regions may be assigned with relatively finer grid structures and are subject to more error smoothing operations than inactive regions. The convergence can be guaranteed by the use of the multigrid method because the multigrid converges as long as smoothing operations at each level can damp the high frequency error.

As an example, the global fine grid at the finest level may be reduced to several local fine grids corresponding to active regions and iterate the smoothing operations only inside these local fine grids. This technique can be used to avoid or reduce the unnecessary computation for inactive regions. This non-global coarsening may also be applied to other coarsening grid levels other than the finest level. Hence, the multi-grid structure may have two or more levels of non-global grids. As described above, the active regions may be detected by the first order derivative of nodal voltages. Relying on the adaptive grid structure and adaptive smoothing, different "time step sizes" may be used for active and inactive subcircuits in the sense that inactive subcircuits may be subject to error smoothing operations at the finest level once every several time points. As a result, iterative smoothing operations are performed in active regions more frequently in time than in inactive regions.

Figure 4:
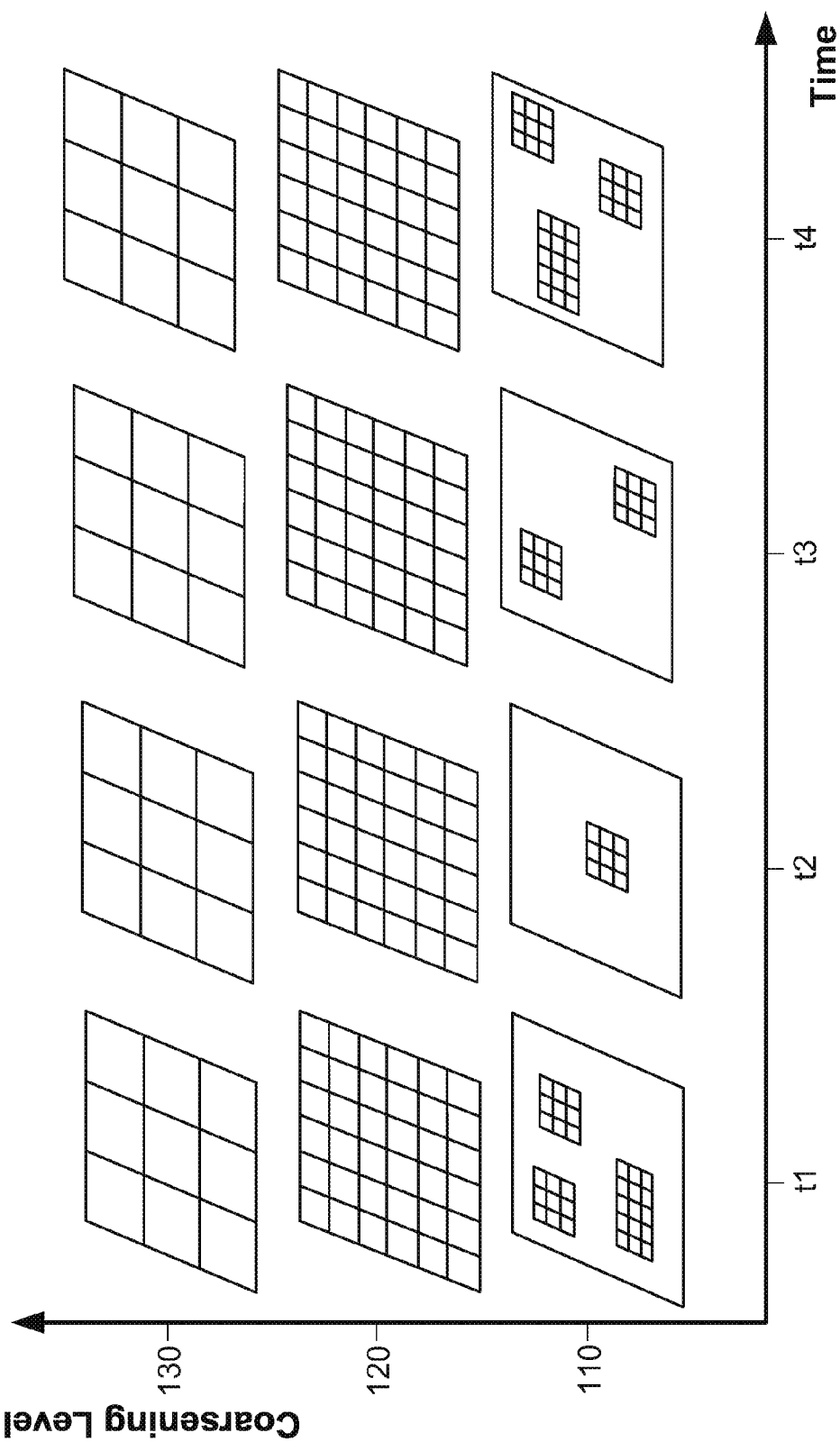
FIG. 4 shows an example of an adaptive 3-level multigrid structure for a circuit network in which a non-global active regions are applied to the finest grid level.

FIG. 4 illustrates an example of configuration changes over time for an adaptive three-level coarsening multigrid structure for a circuit network. The multigrid structures with three levels 110, 120, and 130 at four different times t1, t2, t3, and t4 are shown. Active regions in the finest grid level 110 are shown as local fine grid regions. Such a non-global finest grid level is "adaptive" to changes in the circuit activities. At time t1, the finest grid level has 3 active regions. At t2, however, there is only one active region. At times t3 and t4, the active regions of the circuit network further change. As the active regions changes, the multigrid structure change accordingly as illustrated. In one implementation, the iterative smoothing operation is performed locally in the active regions only in the finest level 110 but is performed globally over all nodes in the coarse levels 120 and 130. The coarsening structures at levels 120 and 120 are also changed dynamically with the circuit network.

Such "adaptive" features in multigrid simulations may be applied to both linear circuits. If a node voltage change in a linear network (power or clock network) between time points is less than a threshold M, this node is considered as an idle node. For active portions, different levels of thresholds may be defined to determine various degrees of activities that results in multi local fine levels of grid structures.

The above multigrid circuit simulations without adaptive features and with adaptive features were implemented in ANSI C and were executed on a SUN Blade100 (300 MHz) workstation with a 2-GB memory. The number of pre-smoothing and post-smoothing iteration were set to 3 at each level and the multigrid iteration termination control residue norm was set at $1 \times 10^{-10}$. At each grid level, the Gauss-Seidel method was used as the smoothing operator.

TABLE 1

| Nodes | SPICE | AMG | Speedup |
|---|---|---|---|
| 1706 | 1.68 | 0.17 | 9.8 |
| 2637 | 3.91 | 0.28 | 14 |
| 5105 | 15.01 | 0.57 | 26.3 |
| 10322 | 54.44 | 0.98 | 55.5 |
| 40842 | 708.22 | 3.93 | 180.2 |
| 91562 | X | 8.98 | |

TABLE 2

| Nodes | SPICE | AMG | Adaptive AMG | Adaptive Speedup |
|---|---|---|---|---|
| 1706 | 18.06 | 1.36 | 1.36 | 13.2 |
| 2637 | 41.23 | 4.08 | 3.78 | 10.9 |
| 5105 | 122.1 | 9.13 | 8.89 | 13.7 |
| 10322 | 456.42 | 18.7 | 18.1 | 25.2 |
| 40842 | 5048.5 | 165.1 | 155.2 | 32.5 |

Table 1 lists results of the DC analysis runtime of SPICE3 and the present AMG method without adaptive features. The results suggest that the present AMG method is more than 100 times faster than SPICE3 for large circuits. Table 2 compares the transient analysis runtime of SPICE3, non-adaptive AMG, and adaptive AMG. The time-varying currents were modeled as triangular waveforms with 2 mA peak current and 40 ps rising and falling time. Details of such modeling may be found, e.g., in S. Zhao, K. Roy, C. K. Koh "Frequency domain analysis of switching noise on power supply network," IEEE/ACM International Conference on Computer Aided Design (2000). Current sources were not evenly distributed and the timings were also different. The transient analysis was conducted for a time duration of 5 ns. Experimental results show that adaptive AMG is faster than non-Adaptive AMG. The speedup against the non-adaptive AMG is not very obvious in part because the adaptive grid structure was applied to achieve fast convergence and the smoothing operations were not made to be adaptive. Additional improvement in speed is expected when the adaptive concept is further applied to smoothing operations at each level. Our approach runs about 20 times faster than SPICE3 for the transient analysis. The performance speedup is comparable with the PCG approach published by T. Chen and C. Chen in "Efficient Large-Scale Power Grid Analysis Based on Preconditioned Krylov-Subspace Iterative Methods", IEEE/ACM Design Automation Conference (2001).

Our tests suggest that the number of multigrid iterations dose not increase rapidly with the problem size and the number of iterations appears to be independent of the problem size.

FIGS. 5A and 5B compare the transient analysis voltage waveforms of one node from SPICE (FIG. 5A) and the present adaptive AMG approach (FIG. 5B). The waveforms are almost the same.

In implementations, the above described multigrid techniques and their variations may be implemented as computer software instructions. Such instructions may be stored on one or more machine-readable storage media or devices and are executed by, e.g., one or more computer processors, or cause the machine, to perform the circuit analysis.

Only a few implementations are disclosed. However, it is understood that variations and enhancements may be made.

What is claimed is:

1. A method for analyzing a circuit network, comprising:
   determining nodal voltages corresponding to nodes of a circuit network and branch currents corresponding to branches of the circuit network, wherein the determining comprises:
      representing the circuit network using a matrix of nodes having fine nodes and coarse nodes that correspond to the nodes of the circuit network, wherein the matrix of nodes represents a system matrix of a matrix equation for determining the nodal voltages and the branch currents;
      applying an adaptive coarse grid construction procedure to assign grid nodes in the matrix as either coarse grid nodes or fine grid nodes according to (1) circuit activities and (2) a matrix structure of the matrix to construct a plurality of levels of grids with different numbers of nodes to respectively represent the circuit network;
      dynamically changing designations of active and inactive regions of the circuit network according to circuit activities at different times;
      applying iterative smoothing operations at selected local fine grids corresponding to active regions at a finest level obtained in the adaptive coarse grid construction procedure;
      computing a residual value of an error after the applying of the iterative smoothing operations at the finest level;
      comparing the residual value to a pre-determined threshold; and
      responsive to a result of the comparing, using the matrix equation to determine the nodal voltages and the branch currents; and
   identifying operational characteristics of the circuit network based on the determined node voltages and branch currents;
   wherein the determining nodal voltages and branch currents and the identifying operational characteristics are performed by one or more computer processors.

2. The method as in 1, wherein the coarse grid nodes are divided into non-adaptive coarse nodes which are selected according to the matrix structure, and adaptive coarse nodes which are selected according to circuit activities.

3. The method as in claim 2, wherein in assigning non-adaptive coarse nodes, a node with a maximum potential in its degree is selected as a first non-adaptive coarse node and each neighboring node of the first non-adaptive coarse node is temporality assigned as a fine node, and wherein a potential of each neighboring node of the first non-adaptive coarse node is increased by one unit before a next level of assigning coarse and fine grid nodes so that each fine node has at least one neighboring coarse node upon completion of assigning non-adaptive coarse nodes.

4. The method as in claim 2, wherein an adaptive coarse node is selected according to a first-order derivative of a nodal voltage.

5. The method as in claim 4, wherein a coarse node is selected as an adaptive coarse node when the first-order derivative the coarse node is greater than a threshold value.

6. The method as in claim 5, wherein the determining nodal voltages and branch currents further comprises selecting adaptive coarse nodes in a level that is not the finest level.

7. The method as in claim 1, after the iterative smoothing operations in a level, wherein the determining nodal voltages and branch currents further comprises:
applying a restriction mapping of nodes in the level to a next level with less nodes;
performing iterative smoothing operations again at the next level; and
repeating the restriction mapping and the iterative smoothing operations until reaching a level of nodes which are solvable by a direct matrix solving method such as a Gaussian elimination method.

8. The method as in claim 1, after the iterative smoothing operations in a level, wherein the determining nodal voltages and branch currents further comprises:
applying an interpolation mapping of nodes in the level to a next level with more nodes;
performing iterative smoothing operations again at the next level; and
repeating the interpolation mapping and the iterative smoothing operations until reaching the finest level of nodes.

9. The method as in claim 8, the determining nodal voltages and branch currents further comprises:
terminating any further processing when the residual value is less than the threshold; and
when residual value is greater than the threshold, the method further comprising:
applying a restriction mapping of nodes in the finest level to a next coarser level with less nodes,
performing iterative smoothing operations again at the next coarser level; and
repeating the restriction mapping and the iterative smoothing operations until reaching a coarsest level of nodes which is solvable by a direct matrix solving method such as a Gaussian elimination method,
applying an interpolation mapping of nodes in the coarsest level to a next finer level with more nodes,
performing iterative smoothing operations at the next finer level,
repeating the interpolation mapping and the iterative smoothing operations until reaching the finest level of nodes, and
repeating the restriction mapping, the interpolation mapping and the respective iterative smoothing operation at different levels until the residual value at the finest level is less than the threshold.

10. The method as in claim 1, the determining nodal voltages and branch currents further comprises applying iterative smoothing operations in active regions more frequently in time than in inactive regions.

11. The method as in claim 1, the determining nodal voltages and branch currents further comprises in a passive linear circuit, applying different models to passive circuits exhibiting resistance and capacitance without inductance and passive circuits exhibiting inductance.

12. The method as in claim 11, wherein the determining nodal voltages and branch currents further comprises separating nodal voltages and branch currents into different vectors during processing to make the system matrix in the matrix equation to be symmetric and positive definite.

13. The method as in claim 1, wherein the operational characteristics comprise at least one of voltage drop, voltage oscillation, electromigration, effects of self and mutual inductances in the network circuit, or coupling effects with electromagnetic retardation for high-frequency chip-package-board assemblies.

14. A method for analyzing a circuit network, comprising:
determining nodal voltages corresponding to nodes of a circuit network and branch currents corresponding to branches of the circuit network, wherein the determining comprises:
representing the circuit network using a plurality of levels of grids with different numbers of nodes to represent the circuit network according to an algebraic multigrid method, wherein the nodes of the levels of grids correspond to the nodes of the circuit network;
assigning a portion of a given level of grids as active local grids and a remainder of the given level of grids as inactive local grids, wherein the active local grids correspond to active circuit regions in the circuit network; and
applying a restriction mapping from a given level of grids to a next coarser level of grids to propagate computation results of the given level of grids to the next coarse level of grids;
applying an interpolation mapping from a given level of grids to a next finer level of grids to propagate computation results of the given level of grids to the next finer level of grids;
performing an iterative smoothing operation at each level of grids to obtain computation results of each level of grids comprising states of nodes in each level of grids, wherein the iterative smoothing operation is performed in a given active local grid more frequently than in a given inactive grid; and
repeating (1) the restriction mapping and the iterative smoothing operation from the finest level of grids to the coarsest level of grids and (2) the interpolation mapping and the iterative smoothing operation from coarsest level of grids back to the finest level of grids for at least one time to obtain a solution to a matrix equation for corresponding nodes of the circuit network, wherein the repeating is performed until a residual error of the solution is less than a predetermined threshold, wherein the solution comprises the nodal voltages and the branch currents; and
identifying operational characteristics of the circuit network based on the determined nodal voltages and branch currents;
wherein the determining nodal voltages and branch currents and the identifying operational characteristics are performed by one or more computer processors.

15. The method as in claim 14, wherein the coarsest level of grids comprises a level of grids where a given matrix equation for corresponding nodes in the coarsest level of grids is solvable by a direct matrix method such as the Gaussian elimination method.

16. The method as in claim 14, wherein at least one of the levels of grids includes nodes corresponding to the active circuit regions in the circuit network and does not include nodes corresponding to inactive circuit regions in the circuit network.

17. The method as in claim 14, wherein the determining nodal voltages and branch currents further comprises:
assigning regions in the finest level of grids with nodes corresponding to the active circuit regions in the circuit network as active local fine grids; and performing the iterative smoothing operation only in the active local fine grids in the finest level of grids to obtain computation results of the finest level of grids.

18. The method as in claim 14, wherein the determining nodal voltages and branch currents further comprises applying an adaptive coarse grid construction procedure to assign nodes of levels of grids in the matrix equation as either coarse grid nodes or fine grid nodes.

19. The method as in claim 18, wherein a given coarse node is assigned by:
assigning a node with a maximum potential to its degree as a first coarse node and all neighboring nodes as initial fine nodes;
for each of the initial fine nodes, increasing a potential of each of neighboring nodes by one unit;
assigning a node which has a maximum potential among other nodes except for the first coarse node as a second coarse node; and
repeating the assigning for nodes that are not assigned as coarse nodes until all nodes are assigned.

20. The method as in claim 18, wherein the coarse nodes are selected according to their values of a first-order derivative of a nodal voltage.

21. The method as in claim 14, wherein the operational characteristics comprise at least one of voltage drop, voltage oscillation, electromigration, effects of self and mutual inductances in the network circuit, or coupling effects with electromagnetic retardation for high-frequency chip-package-board assemblies.

22. A method for analyzing a circuit network, comprising:
determining nodal voltages corresponding to nodes of a circuit network and branch currents corresponding to branches of the circuit network, wherein the determining comprises:
applying an algebraic multigrid method to a matrix representative of the circuit network to construct a plurality of matrices with different degrees of coarsening grids, wherein the coarsening grids correspond to the nodes of the circuit network, and wherein the matrix representative of the circuit network represents a system matrix of a matrix equation for determining the nodal voltages and the branch currents;
representing regions in the circuit network exhibiting active circuit activities with active grids and regions in the circuit network exhibiting less active circuit activities with inactive grids;
performing an iterative smoothing operation in a given active grid more frequently than in a given inactive grid to reduce an amount of computation; and
responsive to performing the iterative smoothing operation at a given grid having a finest degree of coarsening until a residual error of a solution of the matrix equation is less than a predetermined threshold, using the solution of the matrix equation to determine the nodal voltages and the branch currents; and
identifying operational characteristics of the circuit network based on the determined nodal voltages and branch currents;
wherein the determining nodal voltages and branch currents and the identifying operational characteristics are performed by one or more computer processors.

23. The method as in claim 22, wherein the determining nodal voltages and branch currents further comprises:
applying a restriction mapping of nodes in a given coarse grid to a next coarser grid;
performing the iterative smoothing operation at the next coarser grid; and
repeating the restriction mapping and the iterative smoothing operation until reaching the coarsest grid which has a corresponding matrix equation that is solvable by a direct matrix solving method such as a Gaussian elimination method.

24. The method as in claim 22, wherein the determining nodal voltages and branch currents further comprises:
applying an interpolation mapping of nodes in a given grid to a next finer grid;
performing the iterative smoothing operation at the next finer level; and
repeating the interpolation mapping and the iterative smoothing operation until reaching the finest grid.

25. The method as in claim 22, wherein the operational characteristics comprise at least one of voltage drop, voltage oscillation, electromigration, effects of self and mutual inductances in the network circuit, or coupling effects with electromagnetic retardation for high-frequency chip-package-board assemblies.

26. An article comprising a machine-readable medium that stores machine-executable instructions, the instructions causing a machine to:
determine nodal voltages corresponding to nodes of a circuit network and branch currents corresponding to branches of the circuit network, wherein the determination comprises:
apply an algebraic multigrid method to a matrix representative of the circuit network to construct a plurality of matrices with different degrees of coarsening grids, wherein the coarsening grids correspond to the nodes of the circuit network, and wherein the matrix representative of the circuit network represents a system matrix of a matrix equation for determining the nodal voltages and the branch currents;
divide the circuit network into active regions and inactive regions according to circuit activities;
perform an iterative smoothing operation in a given active region more frequently than in a given inactive region to solve for a corresponding matrix equation of each grid and to map a computation result of each grid to a next finer or coarser grid until a residual error of a solution corresponding to a grid having a finest degree of coarsening is less than a pre-determined threshold; and
use the solution of the matrix equation to determine the nodal voltages and the branch currents; and
identify operational characteristics of the circuit network based on the determined nodal voltages and branch currents.

27. The method as in claim 26, wherein the operational characteristics comprise at least one of voltage drop, voltage oscillation, electromigration, effects of self and mutual inductances in the network circuit, or coupling effects with electromagnetic retardation for high-frequency chip-package-board assemblies.

* * * * *

UNITED STATES PATENT AND TRADEMARK OFFICE
CERTIFICATE OF CORRECTION

PATENT NO. : 7,765,497 B2
APPLICATION NO. : 10/558842
DATED : July 27, 2010
INVENTOR(S) : Chung-Kuan Cheng and Zhengyong Zhu It is certified that error appears in the above-identified patent and that said Letters Patent is hereby corrected as shown below:

On Page 2, in Field (56), under "OTHER PUBLICATIONS", in Column 1, Line 9, please delete "al," and insert -- al., --, therefor.

On Page 2, in Field (56), under "OTHER PUBLICATIONS", in Column 1, Line 12, please delete "H.a nd" and insert -- H. and --, therefor.

On Page 2, in Field (56), under "OTHER PUBLICATIONS", in Column 1, Line 24, please delete "Of" and insert -- of --, therefor.

On Page 2, in Field (56), under "OTHER PUBLICATIONS", in Column 1, Line 26, please delete "Of" and insert -- of --, therefor.

On Page 2, in Field (56), under "OTHER PUBLICATIONS", in Column 1, Line 31, please delete "2001. ICCAD" and insert -- 2001, ICCAD --, therefor.

On Page 2, in Field (56), under "OTHER PUBLICATIONS", in Column 1, Line 38, please delete "1989." and insert -- 1989, --, therefor.

On Page 2, in Field (56), under "OTHER PUBLICATIONS", in Column 1, Line 47, please delete "Methofs" and insert -- Methods --, therefor.

On Page 2, in Field (56), under "OTHER PUBLICATIONS", in Column 2, Line 8, please delete "2000." and insert -- 2000, --, therefor.

On Page 2, in Field (56), under "OTHER PUBLICATIONS", in Column 2, Line 11, please delete "Mathemactics,vol." and insert -- Mathematics, vol. --, therefor.

On Page 2, in Field (56), under "OTHER PUBLICATIONS", in Column 2, Line 29, please delete "multigrad" and insert -- multigrid --, therefor.

Signed and Sealed this
Third Day of May, 2011

David J. Kappos
*Director of the United States Patent and Trademark Office*

On Page 2, in Field (56), under "OTHER PUBLICATIONS", in Column 2, Line 32, please delete "On" and insert -- on --, therefor.

On Page 2, in Field (56), under "OTHER PUBLICATIONS", in Column 2, Line 51, please delete "al," and insert -- al., --, therefor.

On Page 2, in Field (56), under "OTHER PUBLICATIONS", in Column 2, Line 61, please delete "al," and insert -- al., --, therefor.

On Page 3, in Field (56), under "OTHER PUBLICATIONS", in Column 1, Line 3, please delete "1995." and insert -- 1995, --, therefor.

On Page 3, in Field (56), under "OTHER PUBLICATIONS", in Column 1, Line 6, please delete "2000." and insert -- 2000, --, therefor.

On Page 3, in Field (56), under "OTHER PUBLICATIONS", in Column 1, Line 8, please delete "457-460." and insert -- 457-460, --, therefor.

On Page 3, in Field (56), under "OTHER PUBLICATIONS", in Column 1, Line 17, please delete "al," and insert -- al., --, therefor.

On Page 3, in Field (56), under "OTHER PUBLICATIONS", in Column 1, Line 21, please delete "al," and insert -- al., --, therefor.

On Page 3, in Field (56), under "OTHER PUBLICATIONS", in Column 1, Line 23, please delete "1995." and insert -- 1995, --, therefor.

On Page 3, in Field (56), under "OTHER PUBLICATIONS", in Column 1, Line 26, please delete "design." and insert -- design, --, therefor.

On Page 3, in Field (56), under "OTHER PUBLICATIONS", in Column 1, Line 33, please delete "Exhibition." and insert -- Exhibition, --, therefor.

On Page 3, in Field (56), under "OTHER PUBLICATIONS", in Column 1, Line 41, please delete "2003." and insert -- 2003, --, therefor.

On Page 3, in Field (56), under "OTHER PUBLICATIONS", in Column 1, Line 47, please delete "879-892." and insert -- 879-892, --, therefor.

On Page 3, in Field (56), under "OTHER PUBLICATIONS", in Column 1, Line 57, please delete "30-330." and insert -- 30-330, --, therefor.

On Page 3, in Field (56), under "OTHER PUBLICATIONS", in Column 1, Line 60, please delete "58-65." and insert -- 58-65, --, therefor.

CERTIFICATE OF CORRECTION (continued)
U.S. Pat. No. 7,765,497 B2

On Page 3, in Field (56), under "OTHER PUBLICATIONS", in Column 2, Line 7, please delete "1992." and insert -- 1992, --, therefor.

On Page 3, in Field (56), under "OTHER PUBLICATIONS", in Column 2, Line 10, please delete "668-684." and insert -- 668-684, --, therefor.

On Page 3, in Field (56), under "OTHER PUBLICATIONS", in Column 2, Line 22, please delete "1983." and insert -- 1983, --, therefor.

On Page 3, in Field (56), under "OTHER PUBLICATIONS", in Column 2, Line 25, please delete "Pages)." and insert -- Pages), --, therefor.

In Column 1, Line 23, please delete "Kirchoff's" and insert -- Kirchhoff's --, therefor.

In Column 4, Line 13, please delete "A1" and insert -- $A^1$ --, therefor.

In Column 4, Line 15, please delete "A0" and insert -- $A^0$ --, therefor.

In Column 4, Line 15, please delete "A2" and insert -- $A^2$ --, therefor.

In Column 4, Line 17, please delete "A1" and insert -- $A^1$ --, therefor.

In Column 4, Line 19, please delete "A0" and insert -- $A^0$ --, therefor.

In Column 4, Line 19, please delete "A1" and insert -- $A^1$ --, therefor.

In Column 4, Line 19, please delete "A2" and insert -- $A^2$ --, therefor.

In Column 4, Line 24, please delete "A0 and A1" and insert -- $A^0$ and $A^1$ --, therefor.

In Column 4, Line 26, please delete "A2" and insert -- $A^2$ --, therefor.

In Column 4, Line 29, please delete "A0x0=b0" and insert -- $A^0 x^0 = b^0$ --, therefor.

In Column 4, Line 31, please delete "A1x1=b1" and insert -- $A^1 x^1 = b^1$ --, therefor.

In Column 4, Line 33, please delete "A2x2=b2" and insert -- $A^2 x^2 = b^2$ --, therefor.

In Column 4, Line 35, please delete "A0 to A1" and insert -- $A^0$ to $A^1$ --, therefor.

In Column 4, Line 36, please delete "A2" and insert -- $A^2$ --, therefor.

In Column 4, Line 37, please delete "A2 to A1" and insert -- $A^2$ to $A^1$ --, therefor.

In Column 4, Line 37, please delete "A0" and insert -- $A^0$ --, therefor.

CERTIFICATE OF CORRECTION (continued)

In Column 4, Line 41, please delete "A0→A1→A2→A1→A0" and insert -- $A^0 \rightarrow A^1 \rightarrow A^2 \rightarrow A^1 \rightarrow A^0$ --, therefor.

In Column 4, Line 44, please delete "A0x0=b0" and insert -- $A^0 x^0 = b^0$ --, therefor.

In Column 4, Line 46, please delete "A0x=b" and insert -- $A^0 x = b$ --, therefor.

In Column 4, Line 48, please delete "A0" and insert -- $A^0$ --, therefor.

In Column 4, Line 50, please delete "(A1)" and insert -- $(A^1)$ --, therefor.

In Column 4, Line 51, after "in", please delete "A1" and insert -- $A^1$ --, therefor.

In Column 4, Line 51, please delete "A0" and insert -- $A^0$ --, therefor.

In Column 4, Line 51, after "on", please delete "A1" and insert -- $A^1$ --, therefor.

In Column 4, Line 52, please delete "A0" and insert -- $A^0$ --, therefor.

In Column 4, Line 53, please delete "(A2) based on A1" and insert -- $(A^2)$ based on $A^1$ --, therefor.

In Column 4, Line 54, please delete "A1" and insert -- $A^1$ --, therefor.

In Column 4, Line 55, please delete "A2 is mapped from nodes 3 and 4 on A1" and insert -- $A^2$ is mapped from nodes 3 and 4 on $A^1$ --, therefor.

In Column 4, Line 56, please delete "(e.g., A1)" and insert -- (e.g., $A^1$) --, therefor.

In Column 4, Line 57, please delete "(e.g., A2)" and insert -- (e.g., $A^2$) --, therefor.

In Column 4, Line 58, please delete "(e.g., A1)" and insert -- (e.g., $A^1$) --, therefor.

In Column 4, Line 58, please delete "(e.g., A0)" and insert -- (e.g., $A^0$) --, therefor.

In Column 4, Lines 62-63, please delete "A0x0and b0 for A0, A1x1 and b1 for A1, or A2x2 and b2 for A2" and insert -- $A^0 x^0$ and $b^0$ for $A^0$, $A^1 x^1$ and $b^1$ for $A^1$, or $A^2 x^2$ and $b^2$ for $A^2$ --, therefor.

In Column 5, Line 11, please delete " $I_n^{2h}$ " and insert -- $I_h^{2h}$ --, therefor.

In Column 5, Line 12, please delete " $I_{2b}^{h}$ " and insert -- $I_{2h}^{h}$ --, therefor.

CERTIFICATE OF CORRECTION (continued)
U.S. Pat. No. 7,765,497 B2

In Column 9, Line 5, please delete "V1" and insert -- $V^1$ --, therefor.

In Column 9, Lines 10-13, in equation "(4.1)", please delete "$-\begin{bmatrix} G_{11} G_{13} \\ G_{21} G_{33} \\ A_{13} A_{12} \end{bmatrix}$" and insert -- $-\begin{bmatrix} G_{11} G_{12} \\ G_{21} G_{22} \\ A_{11} A_{12} \end{bmatrix}$ --, therefor.

In Column 9, Line 55, please delete "A1" and insert -- $A^1$ --, therefor.

In Column 9, Line 56, please delete "A2" and insert -- $A^2$ --, therefor.

In Column 9, Line 57, please delete "A0" and insert -- $A^0$ --, therefor.

In Column 9, Line 58, after "coarse nodes.", please delete "Coarse nodes".

In Column 10, Line 61, please delete "120 and 120" and insert -- 120 and 130 --, therefor.

In Column 12, Line 51, in claim 2, please delete "1" and insert -- Claim 1 --, therefor.